(12) United States Patent  
Fang

(10) Patent No.: US 9,396,172 B2  
(45) Date of Patent: Jul. 19, 2016

(54) METHOD FOR DATA CHUNK PARTITIONING IN XML PARSING AND METHOD FOR XML PARSING

(71) Applicant: Yuejian Fang, Beijing (CN)

(72) Inventor: Yuejian Fang, Beijing (CN)

( * ) Notice: Subject to any disclaimer, the term of this patent is extended or adjusted under 35 U.S.C. 154(b) by 674 days.

(21) Appl. No.: 13/854,741

(22) Filed: Apr. 1, 2013

(65) Prior Publication Data

US 2014/0149851 A1 May 29, 2014

(30) Foreign Application Priority Data

Nov. 28, 2012 (CN) .......................... 2012 1 0495961

(51) Int. Cl.
*G06F 17/00* (2006.01)
*G06F 17/22* (2006.01)
*G06F 17/27* (2006.01)

(52) U.S. Cl.
CPC .......... *G06F 17/2247* (2013.01); *G06F 17/272* (2013.01); *G06F 17/2725* (2013.01)

(58) Field of Classification Search
CPC . G06F 17/218; G06F 17/272; G06F 17/2725; G06F 17/2775
USPC ......................................... 715/200, 234, 237
See application file for complete search history.

(56) References Cited

U.S. PATENT DOCUMENTS

| | | | |
|---|---|---|---|
| 7,512,615 B2 * | 3/2009 | Bordawekar | G06F 17/30923 |
| 8,250,464 B2 | 8/2012 | Dang et al. | |
| 8,432,404 B2 * | 4/2013 | Kota | G06T 11/00 345/440 |
| 8,838,626 B2 * | 9/2014 | Yu | G06F 17/2247 707/602 |
| 8,838,951 B1 * | 9/2014 | Hicks | H04L 63/105 705/7.27 |
| 2006/0182418 A1 * | 8/2006 | Yamagata | G11B 27/105 386/248 |
| 2007/0100920 A1 * | 5/2007 | Funnekotter | G06F 17/2247 708/233 |
| 2008/0147790 A1 * | 6/2008 | Malaney | G06Q 10/00 709/203 |
| 2009/0006944 A1 | 1/2009 | Dang et al. | |
| 2010/0149091 A1 * | 6/2010 | Kota | G06T 11/00 345/156 |
| 2011/0153604 A1 * | 6/2011 | Yu | G06F 17/2247 707/737 |
| 2012/0079364 A1 * | 3/2012 | Agarwal | G06F 8/456 715/234 |

* cited by examiner

*Primary Examiner* — Stephen Hong
*Assistant Examiner* — Gregory J Vaughn
(74) *Attorney, Agent, or Firm* — Vierra Magen Marcus LLP

(57) ABSTRACT

A method for data chunk partitioning in XML parsing and a method for XML parsing are disclosed in the invention, the method for data chunk partitioning in XML parsing includes: partitioning an XML file into multiple XML data segments, and allocating the multiple XML data segments to multiple threads for parallel processing; determining a candidate boundary start symbol in the XML data segment; determining a boundary symbol type of the candidate boundary start symbol, and recording the boundary symbol type and a position of the candidate boundary start symbol; determining a valid boundary start symbol; partitioning the XML file into multiple data chunks by taking the valid boundary start symbol as a boundary. With the method, the integrity of the XML elements in each data chunk can be ensured, and thus effectively improving the efficiency of XML data parsing.

6 Claims, 4 Drawing Sheets

METHOD FOR DATA CHUNK PARTITIONING IN XML PARSING AND METHOD FOR XML PARSING

FIELD OF THE INVENTION

The invention relates to the field of computer programming, and particularly to a method for data chunk partitioning in XML parsing and a method for XML parsing.

BACKGROUND OF THE INVENTION

Extensible Markup Language (XML) is widely used in the fields of network services, databases, and file processing. The XML has the following characteristics: the content and the structure of the document being completely separated; strong interoperability; unified standard; supporting a variety of coding; and good expandability.

Since the XML file may include a multi-level nested data structure, the XML parsing is usually complex. In multi-core processor environment, the use of a multi-core structure-based design for XML parallel parsing can improve parsing speed of the XML parsing. Presently, in the commonly used XML parallel parsing method, it is required to partition an XML file into multiple data chunks with the same size, and then parse the multiple data chunks in parallel by multiple cores of a multi-core processor.

However, after research, the inventor has found that in the prior art, if the XML file is partitioned into multiple data chunks with the same size, the content of one XML element may be distributed into two different chunks, and the parsing program can only parse this data in a speculating manner. Furthermore, in parallel-parsing multiple data chunks, it is required to check the data-dependent relationship between the data chunks, which will lead to frequent communications between the threads of the parallel parsing. When the thread is waiting for a communication response, the running is suspended or the processing speed slows down, thus affecting the efficiency of parallel processing.

SUMMARY OF THE INVENTION

In view of this, an object of an embodiment of the invention is to provide a method for data chunk partitioning in XML parsing and a method for XML parsing.

To achieve the above object, according to the embodiment of the invention, it is provided a technical solution as follows:

A method for XML data chunk partitioning, including:

a stage of determining a candidate boundary start symbol, which includes:

partitioning an XML file into multiple XML data segments with a preset length, and allocating the multiple XML data segments to multiple threads for parallel processing;

searching a specific character or a specific character string sequentially in the XML data segments to determine the candidate boundary start symbol, the specific character includes "<", and the specific character string includes "</", "<?", "<!--" or "<![CDATA["; and determining a boundary symbol type of the candidate boundary start symbol, and recording the boundary symbol type and a position of the candidate boundary start symbol; and a stage of determining a valid boundary start symbol, which includes:

searching the candidate boundary start symbol sequentially from a start position of the XML file according to the position of the candidate boundary start symbol; if the candidate boundary start symbol is "<" or "</", determining the "<" or "</" as a valid boundary start symbol;

if the searched candidate boundary start symbol is a character string that differs from "</", determining the character string as a valid boundary start symbol, and searching a valid boundary end symbol corresponding to the valid boundary start symbol according to the boundary symbol type of the valid boundary start symbol; setting a candidate boundary start symbol between the valid boundary start symbol and the valid boundary end symbol as an invalid boundary start symbol; and partitioning the XML file into multiple data chunks by taking the valid boundary start symbol as a boundary.

Preferably, in an embodiment of the invention, the data chunk includes a plurality of the boundary start symbols.

Furthermore, according to an embodiment of the invention, there is also provided a method for XML parsing, including:

a stage of determining a candidate boundary start symbol, which includes:

partitioning an XML file into multiple XML data segments with a preset length, and allocating the multiple XML data segments to multiple threads for parallel processing;

searching a specific character or a specific character string sequentially in the XML data segment to determine a candidate boundary start symbol; the specific character includes "<", and the specific character string comprising "</", "<?", "<!--" or "<![CDATA["; and determining a boundary symbol type of the candidate boundary start symbol, and recording the boundary symbol type and a position of the candidate boundary start symbol;

a stage of determining a valid boundary start symbol, which includes:

searching the candidate boundary start symbol sequentially from the start position of the XML file according to the position of the candidate boundary start symbol; if the candidate boundary start symbol is "<" or "</", determining the "<" or "</" as a valid boundary start symbol;

if the searched candidate boundary start symbol is a character string that differs from "</", determining the character string as a valid boundary start symbol, and searching a valid boundary end symbol corresponding to the valid boundary start symbol according to the boundary symbol type of the valid boundary start symbol; setting a candidate boundary start symbol between the valid boundary start symbol and the valid boundary end symbol as an invalid boundary start symbol; and partitioning the XML file into multiple data chunks by taking the valid boundary start symbol as a boundary; and a stage of parallel-parsing data chunks, which includes:

allocating the multiple data chunks to multiple threads for parallel processing, so as to parse the data chunks.

Preferably, in an embodiment of the invention, the method for XML parsing further includes:

if no matching start element or end element is found in the data chunk or a namespace of the start element does not get resolving in the data chunk, determining the start element or end element as an unresolved element, and recording the unresolved element into a preset data structure.

Preferably, in an embodiment of the invention, the method for XML parsing further includes:

if there are multiple unresolved elements, connecting the multiple unsolved elements to form an unresolved element chain before parsing the unresolved elements.

Preferably, in an embodiment of the invention, the method for XML parsing further includes:

performing checking and processing on the unresolved elements of the data chunks in accordance with the order of the data chunks in the XML file; and combining the sub-result data generated by the data chunks into overall result data.

In summary, the method for data chunk partitioning according to the embodiments of the invention, the integrity of the XML elements in each data chunk can be ensured, thus effectively avoiding a speculating process by a parsing program in the subsequent XML data parsing process due to the non-integrity of the XML elements, and thus effectively improving the efficiency of XML data parsing.

DETAILED DESCRIPTION OF THE INVENTION

To make objects, technical solutions and advantages of the invention more clear and easy to be understood, the invention will be illustrated in detail hereinafter with reference to drawings and embodiments of the invention.

Figure 1:
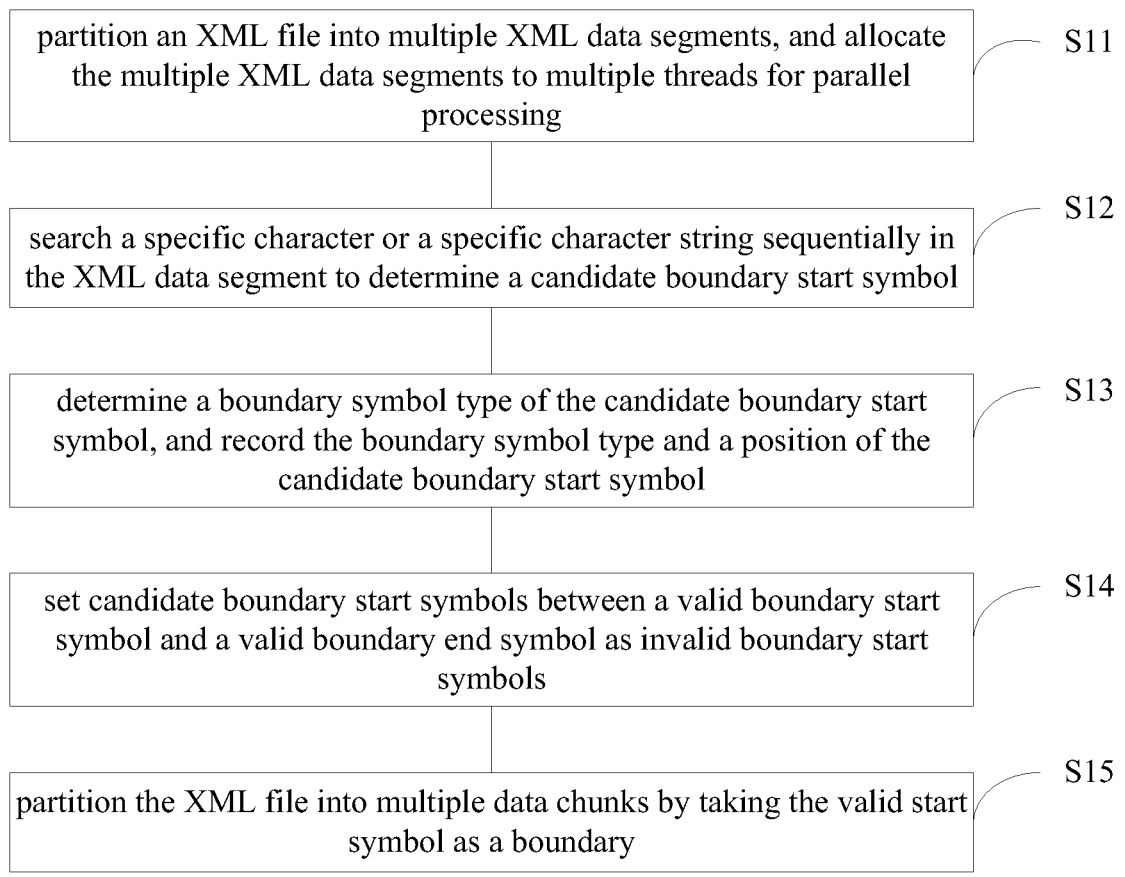
FIG. 1 is a schematic flow chart of a method for XML data chunk partitioning according to an embodiment of the invention.

In the prior art, in order to process XML data in parallel, the XML data is partitioned, i.e., the XML data is partitioned into multiple data chunks with the same size, thus the multiple data chunks can be processed in parallel by different processors for improving the parsing speed. Since the XML data is partitioned only in accordance with the size of the data chunk in the prior art, a same XML element may be distributed into different data chunks. In this way, in the parsing process, the parsing program needs to parse the integrity XML data in a speculating manner, thereby reducing the parsing efficiency. Therefore, according to the present application, it is provided a method for XML data chunk partitioning to improve the efficiency of XML data parsing. As shown in FIG. 1, the specific steps are as follows:

In an embodiment of the invention, the method for XML data chunk partitioning is divided into two stages, wherein a stage of determining a candidate boundary start symbol includes:

S11, partitioning an XML file into multiple XML data segments with a preset length, and allocating the multiple XML data segments to multiple threads for parallel processing;

Since the length of the XML file may be very large, in the present application in order to take full advantage of parallel computing ability of a computer, when parsing the XML file, the XML file is firstly partitioned into multiple XML data segments with a preset length, and the multiple XML data segments are allocated to multiple threads for parallel processing. In this way, the efficiency of the subsequent work can be improved.

S12, searching a specific character or a specific character string sequentially in the XML data segment to determine a candidate boundary start symbol; the specific character includes "<", and the specific character string includes "</", "<?", "<!--" or "<![CDATA[".

According to the embodiment of the invention, when partitioning the XML file into multiple data chunks, a boundary start symbol is used as a boundary, and it is required to ensure that the boundary start symbol used as the boundary is a valid boundary start symbol. Since the partitioned data chunks in the embodiment of the invention includes integrate XML elements as far as possible, the frequency of communications between the parsing threads when parsing multiple data chunks in parallel is reduced, thereby improving the parsing efficiency.

In order to accurately recognize a valid boundary start symbol, firstly a boundary start symbol which may be a valid boundary start symbol is determined as a candidate boundary start symbol.

Figure 2:
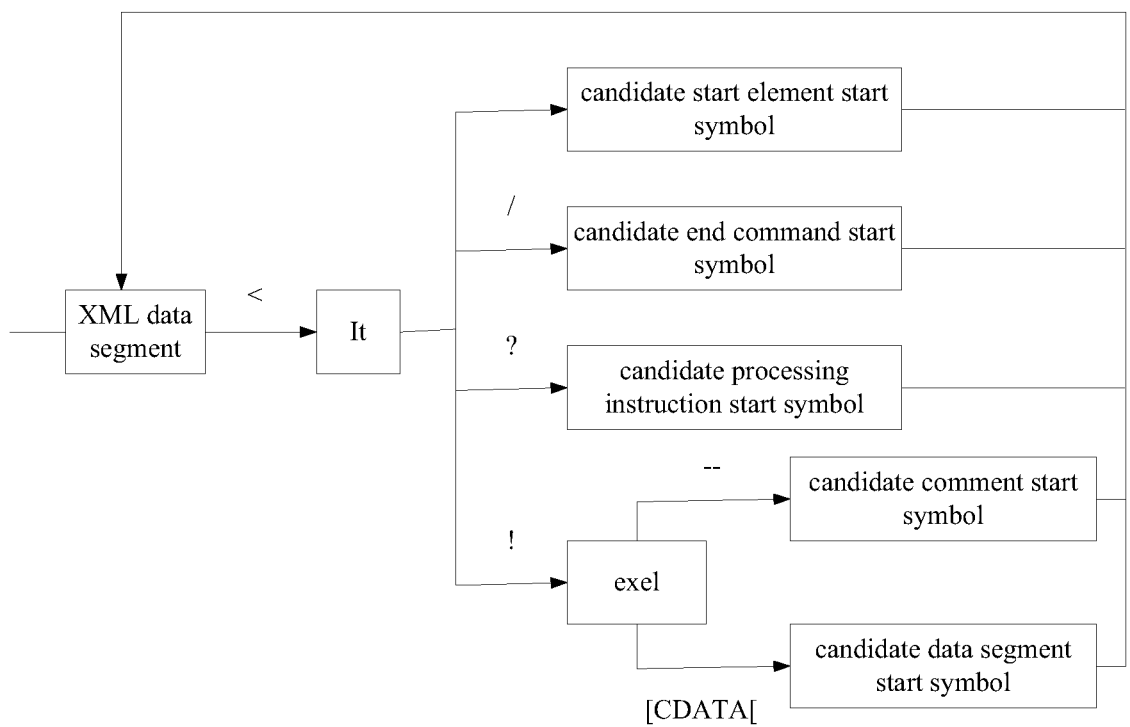
FIG. 2 is a schematic flow chart showing a process of searching a candidate boundary start symbol according to an embodiment of the invention.

As shown in FIG. 2, a process of recognizing characters in the XML data segment sequentially to determine whether the character is a candidate boundary start symbol includes:

searching the character "<" sequentially in each XML data segment; after finding a character "<", determining whether it is followed by a character "/" or "?" or "!"; if it is followed by a character "!", determining whether the character "!" is followed by "--" or followed by "[CDATA[". All the characters or character strings that meet the above rule are determined as the candidate boundary start symbols.

That is to say, the characters or character strings belonging to the candidate boundary start symbol includes a candidate start element start symbol "<", a candidate end element start symbol "</", a candidate processing instruction start symbol "<?", a candidate comment start symbol "<!--" or a candidate data segment start symbol "<![CDATA[". Therefore, the candidate boundary start symbol in the XML data segment can be determined by recognizing sequentially the characters or character strings in the XML data segment and determining whether the characters or character strings are the characters or character strings described above.

S13, determining a boundary symbol type of the candidate boundary start symbol, and recording the boundary symbol type and a position of the candidate boundary start symbol;

After the candidate boundary start symbol is determined, it is also required to determine the boundary symbol type of the candidate boundary start symbol. The boundary symbol type generally includes a start element boundary symbol, an end element boundary symbol, a processing instruction boundary symbol, a comment boundary symbol and a data segment boundary symbol.

The boundary symbol includes two types: a boundary start symbol and a boundary end symbol, i.e. a boundary start symbol is used at a position indicating the starting of a certain XML element, and a boundary end symbol is used at a position indicating the ending of a certain XML element. For example, the processing instruction boundary symbol includes a processing instruction start symbol "<?" and a processing instruction end symbol "?>".

After determining the boundary symbol type of the candidate boundary start symbol, it is also required to record the boundary symbol type and the position of the candidate boundary start symbol.

After recording the boundary symbol type and the position of the candidate boundary start symbol, the following is a stage of determining a valid boundary start symbol, and the stage of determining the valid boundary start symbol is a non-parallel process having a strict order, which includes:

S14, searching the candidate boundary start symbol sequentially from the start position of the XML file according to the position of the candidate boundary start symbol; if the candidate boundary start symbol is "<" or "</", determining the "<" or "</" as a valid boundary start symbol; and if the searched candidate boundary start symbol is a character string differing from "</", determining the character string as a valid boundary start symbol, and searching a valid boundary end symbol corresponding to the valid boundary start symbol according to the boundary symbol type of the valid boundary start symbol; setting the candidate boundary start symbols between the valid boundary start symbol and the valid boundary end symbol as invalid boundary start symbols;

Since the position of the candidate boundary start symbol is recorded in the previous step, the valid boundary start symbol can be determined from the multiple candidate boundary start symbols according the position of the candidate boundary start symbol.

Figure 3:
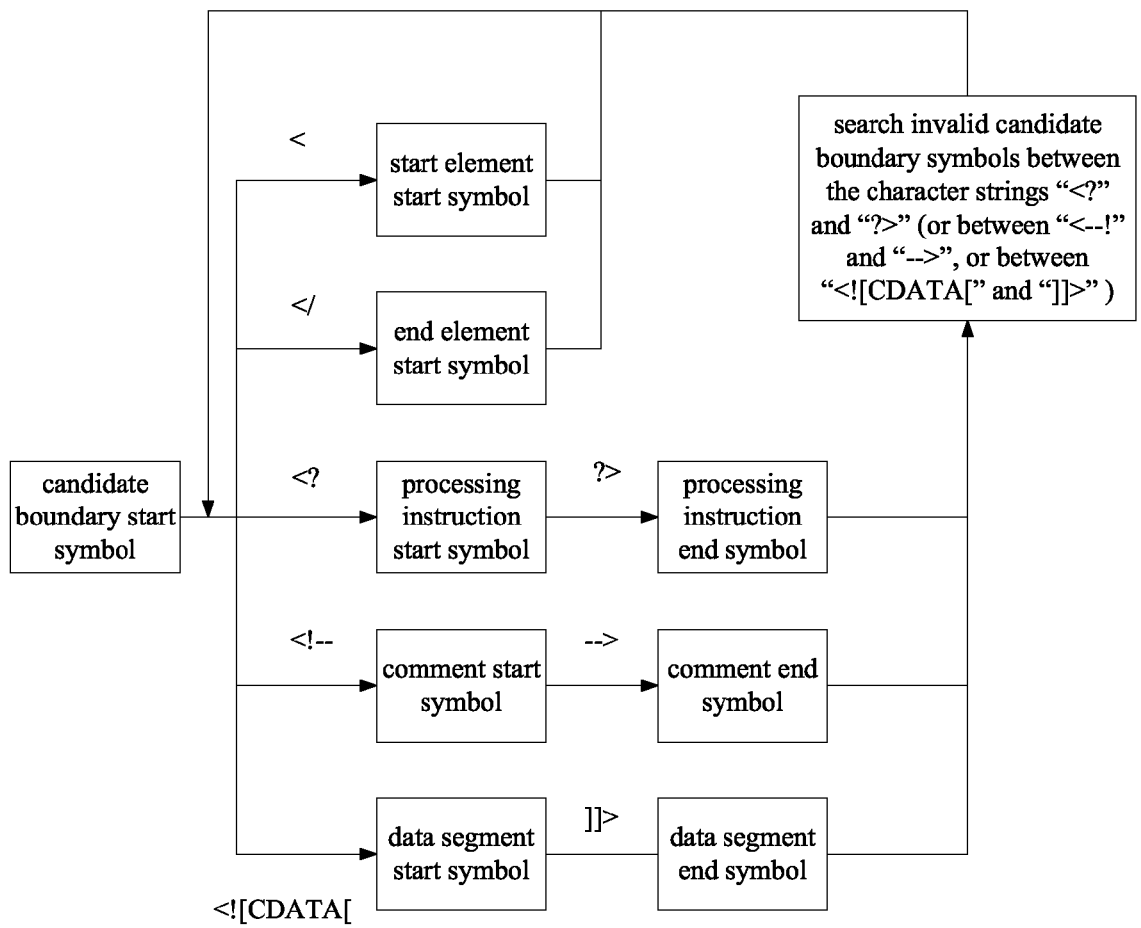
FIG. 3 is a schematic flow chart showing a process of searching a valid boundary start symbol according to an embodiment of the invention.

As shown in FIG. 3, the process of determining the valid boundary start symbol by searching the candidate boundary start symbols sequentially includes that:

if a character "<" or a character string "</" is found, it can be directly determined as a valid boundary start symbol; if other candidate boundary start symbol is found and determined as a valid boundary start symbol, it is required to find a valid boundary end symbol corresponding to the valid boundary start symbol, and set the candidate boundary start symbols between the valid boundary start symbol and the corresponding valid boundary end symbol as invalid boundary start symbols. In this way, the invalid boundary start symbol can be excluded, thus ensuring correct selection for the boundary start symbol.

Specifically, if a character "<" is found, the character "<" is recognized as a valid start element start symbol, if a character string of "</" is found, it is recognized as a valid end element start symbol;

if a character string "<?" is found, it is recognized as a valid processing instruction start symbol, the first "?>" that appears in the XML data stream from the position of the character string "<?" in the XML data stream is searched, and the searched first "?>" is the processing instruction end symbol. It is determined that whether there is other candidate boundary symbol between the processing instruction start symbol and the processing instruction end symbol according to the positions of the processing instruction start symbol and the processing instruction end symbol, if there is other candidate boundary symbol, the candidate boundary symbol is marked as an invalid boundary start symbol.

Since the end symbol "?>" is not allowed to appear between the processing instruction start symbol of "<?" and the processing instruction end symbol of "?>" of, but other candidate boundary start symbol is allowed to appear therebetween. Therefore, there may be other candidate boundary start symbols appearing between the processing instruction start symbol "<?" and the processing instruction end symbol "?>". For example, an XML data segment includes the following characters:

<? . . . < . . . <? . . . <!-- . . . --> . . . <![CDATA[ . . . ]]> . . . ?>, in the above data segment, only the first "<?" is a valid boundary symbol, and the entire data segment is a processing instruction, the character strings "<!--" and "-->" contained in the data segment will not be recognized as a comment start symbol and a comment end symbol, and the character strings "<![CDATA[" and "]]>" contained in the data segment will not be recognized as a data segment start symbol and a data segment end symbol, wherein the second "<?" is not a processing instruction start symbol, but the content of the processing instruction.

If a character string "<!--" is found, it is recognized as a valid comment start symbol, and the first "-->" that appears in the XML data stream from the position of the character string "<!--" in the XML data stream is searched, and the searched first "-->" is the end symbol of the comment. It is determined that whether there is other candidate boundary symbol between the comment start symbol and the comment start symbol according to the positions of the comment start symbol and the comment end symbol, if there is other candidate boundary start symbol, the candidate boundary start symbol is marked as an invalid boundary start symbol;

Similarly, the end symbol "-->" is not allowed to appear between the comment start symbol "<!--" and the comment end symbol "-->", but other candidate boundary start symbol is allowed to appear therebetween. For example, an XML data segment includes the following characters:

<!-- . . . < . . . <? . . . ?> . . . <![CDATA[ . . . ]]> . . . -->, in this data segment, only the first "<![CDATA[" is a valid boundary symbol, and the entire data segment is a comment, the character strings "<?" and "?>" contained in the data segment will not be recognized as a processing instruction start symbol and a processing instruction end symbol, and the character strings "<![CDATA[" and "]]>" contained in the data segment will not be recognized as a data segment start symbol and a data segment end symbol, and thus will not be recognized as a valid boundary start symbol, but the content of the comment.

If a character string "<![CDATA[" is found, it is recognized as a valid data segment start symbol, and the first "]]>" that appears in the XML data stream from the position of the character string "<![CDATA[" in the XML data stream is searched, and the searched first "]]>" is the end symbol of the data segment. It is determined that whether there is other candidate boundary symbol between the data segment start symbol and the data segment end symbol according to the positions of the data segment start symbol and the data segment end symbol, if there is other candidate boundary symbol, the candidate boundary symbol is marked as an invalid boundary start symbol.

Similarly, the end symbol "]]>" is not allowed to appear between the data segment start symbol "<![CDATA[" and the data segment end symbol "]]>" of the data segment, but other candidate boundary start symbol is allowed to appear therebetween. For example, an XML data segment includes the following characters:

<![CDATA[ . . . <? . . . < . . . <? . . . ?> . . . <!-- . . . --> . . . <![CDATA[ . . . ]]>, in this data segment, only the first "<![CDATA[" is a valid boundary symbol, and the entire data segment is a data segment, the character strings "<!--" and "-->" contained in the data segment will not be recognized as a comment start symbol and a comment end symbol, and the character strings "<?" and "?>" contained in the data segment will not be recognized as a processing instruction start symbol and a processing instruction end symbol, the second "<![CDATA[" is not a data segment start symbol, but the content of the data segment.

S15, partitioning the XML file into multiple data chunks by taking the valid boundary start symbol as a boundary.

After the valid boundary start symbol is determined, it is possible to partition the XML file into multiple data chunks by taking the valid boundary symbol as a boundary, thus the multiple data chunks can be processed in parallel by multiple processors.

The method for data chunk partitioning according to the embodiments of the invention can ensure the integrity of the XML elements in each data chunk, thus effectively avoiding a speculating process by a parsing program in the subsequent XML data parsing process due to the non-integrity of the XML elements, and thus effectively improving the efficiency of XML data parsing.

Preferably, in the embodiments of the invention, in order to avoid the case that data chunks are allocated to the processor frequently due to the over-small data chunk that includes only a single XML element, in the embodiment of the invention, multiple boundary start symbols can be included in each data chunk; that is, multiple XML elements can be included in each data chunk.

Figure 4:
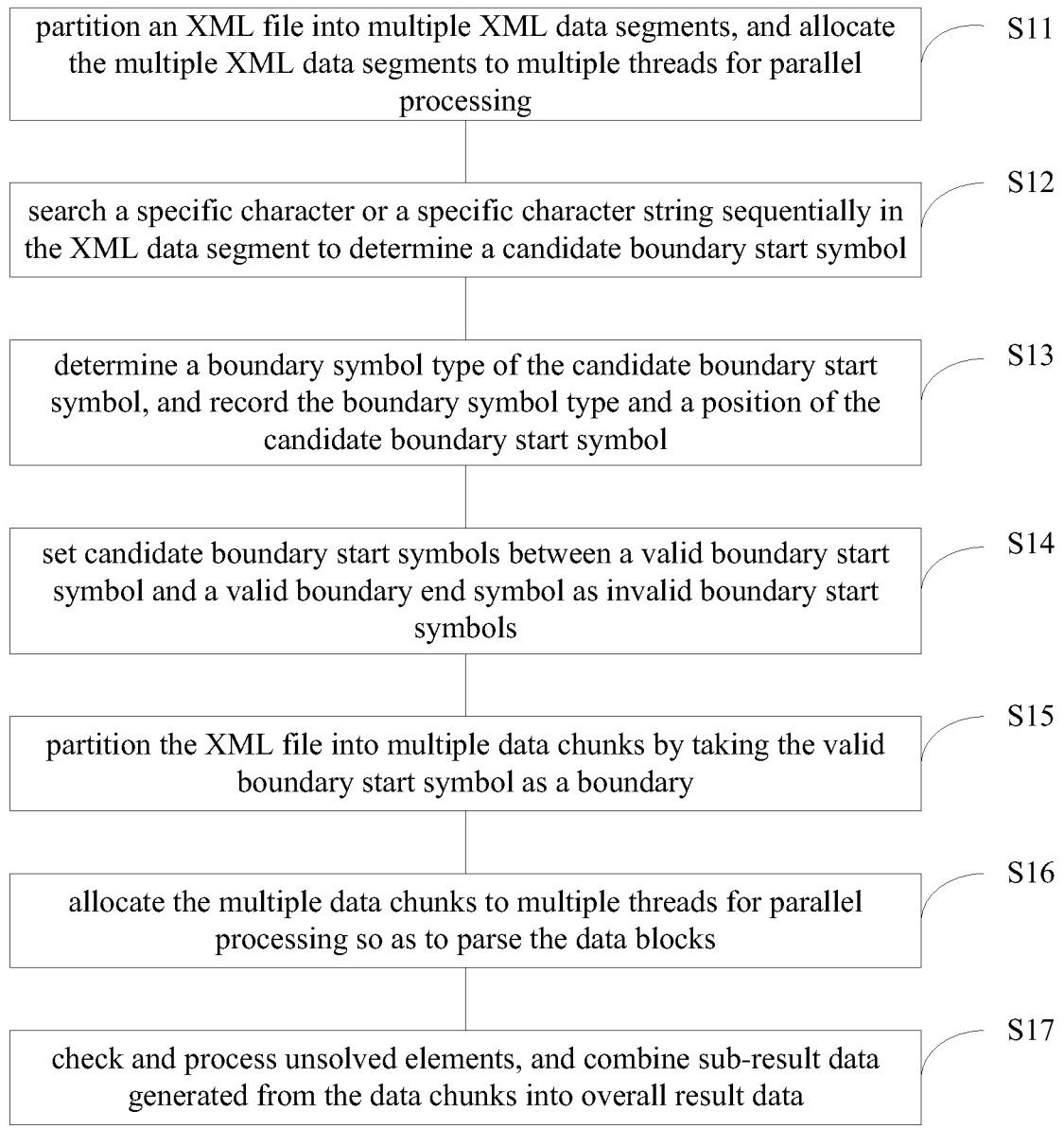
FIG. 4 is a schematic flow chart showing a method for XML parsing according to an embodiment of the invention.

Further, according to the present invention, it is provided a method for XML parsing. As shown in FIG. 4, in addition to the method for data chunk partitioning described in the above embodiments, the method for XML parsing also includes the following steps:

a stage of parallel-parsing data chunks, which includes:

S16, allocating the multiple data chunks to multiple threads for parallel processing, so as to parse the data chunks.

After the XML data is partitioned into multiple data chunks by the method for data chunk partitioning in XML data parsing provided in the embodiment corresponding to FIG. 1, it is also required to parse the multiple data chunks in parallel by different processors. In the embodiment of the invention, since the XML elements in each data chunk are integrated, thus effectively avoiding a speculating process by a parsing program in the subsequent XML data parsing process due to the non-integrity of the XML elements, and thus effectively improving the efficiency of XML data parsing.

Preferably, in the embodiment of the invention, the method for XML parsing further includes: if no matching start element and end element are found in a data chunk or a namespace of the start element does not get resolving in the data chunk, determining the start element or end element as an unresolved element, recording the unresolved element into a preset data structure; and connecting multiple unresolved elements to form an unresolved element chain before parsing the unresolved elements, so that in a post-processing stage, the searching time can be reduced effectively, thus further improving the parsing efficiency.

Furthermore, the invention embodiment, the method for XML parsing can further include the post-processing stage, the specific steps of which include:

S17, performing checking and processing the unresolved elements of the data chunks in accordance with the order of the data chunks in the XML file; and combining sub-result data generated from the data chunks into overall result data.

The above-described is only preferred embodiments of the invention. It should be noted that numerous variations and modifications can be made by those skilled in the art without departing from the principle of the invention, and these variations and modifications should also be considered as falling within the scope of protection of the invention.

The invention claimed is:

1. A method for Extensible Markup Language (XML) data chunk partitioning, comprising:

a stage of determining a candidate boundary start symbol, which comprises:

partitioning an XML file into multiple XML data segments with a preset length, and allocating the multiple XML data segments to multiple threads for parallel processing;

searching a specific character or a specific character string sequentially in the XML data segments to determine the candidate boundary start symbol; wherein the specific character comprises "<", and the specific character string comprises "</", "<?", "<!--" or "<![CDATA["; and determining a boundary symbol type of the candidate boundary start symbol, and recording the boundary symbol type and a position of the candidate boundary start symbol; and a stage of determining a valid boundary start symbol, which comprises:

searching the candidate boundary start symbol sequentially from a start position of the XML file according to the position of the candidate boundary start symbol; if the candidate boundary start symbol is "<" or "</", determining the "<" or "</" as a valid boundary start symbol;

if the searched candidate boundary start symbol is a character string that differs from "</", determining the character string as a valid boundary start symbol, and searching a valid boundary end symbol corresponding to the valid boundary start symbol according to the boundary symbol type of the valid boundary start symbol; setting a candidate boundary start symbol between the valid boundary start symbol and the valid boundary end symbol as an invalid boundary start symbol; and partitioning the XML file into multiple data chunks by taking the valid boundary start symbol as a boundary.

2. The method for XML, data chunk partitioning according to claim 1, wherein the data chunk comprises a plurality of the boundary start symbols.

3. A method for XML parsing, comprising the method for XML data chunk partitioning according to claim 1, wherein: after the XML file is partitioned into the multiple data chunks, the method for XML parsing comprises:

allocating the multiple data chunks to multiple threads for parallel processing, so as to parse the data chunks.

4. The method for XML parsing according to claim 3, further comprising:

if no matching start element or end element is found in the data chunk or a namespace of the start element does not get resolving in the data chunk, determining the start element or end element as an unresolved element, and recording the unresolved element into a preset data structure.

5. The method for XML parsing according to claim 4, further comprising:

if there are a plurality of unresolved elements, connecting the plurality of unresolved elements to form an unresolved element chain before parsing the unresolved elements.

6. The method for XML parsing according to claim 5, further comprising:

performing checking and processing on the unresolved elements of the data chunks in accordance with the order of the data chunks in the XML file; and combining sub-result data generated from the data chunks into overall result data.

* * * * *